Patent 3,369,982 — Feb. 20, 1968

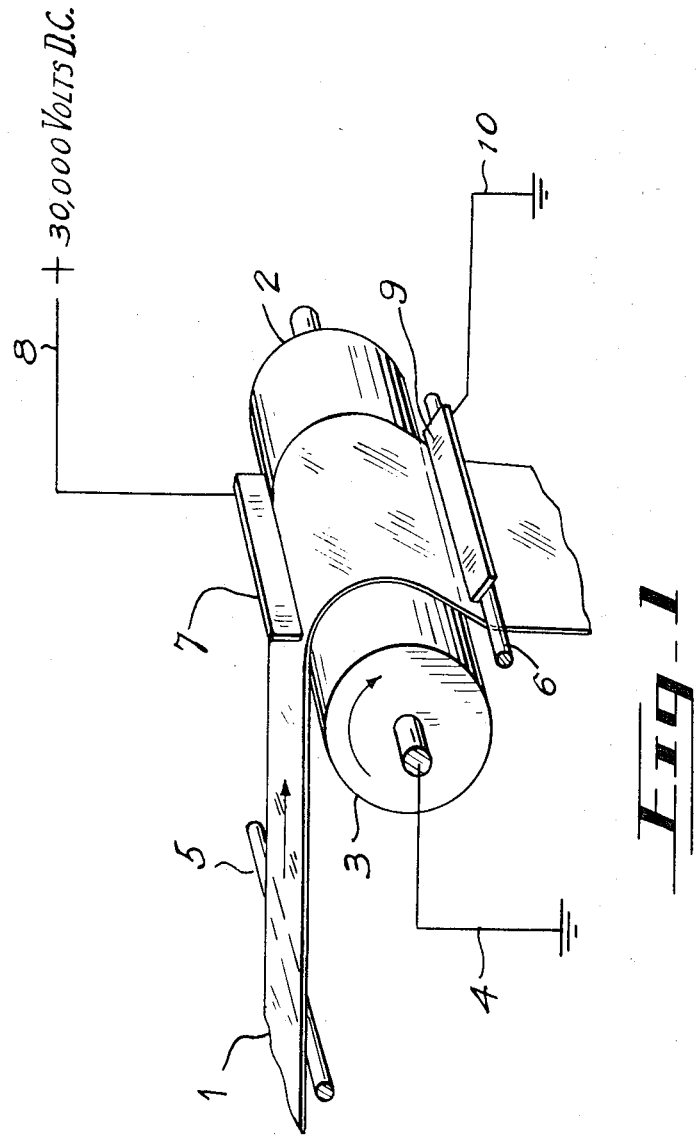

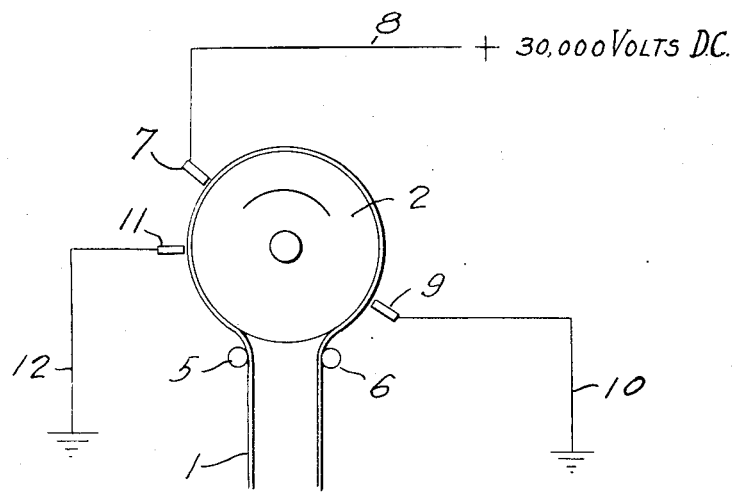

3,369,982
METHOD OF IMPROVING THE ADHESIVE PROPERTIES OF POLYOLEFIN FILM BY PASSING A DIFFUSE ELECTRICAL DISCHARGE OVER THE FILM'S SURFACE
Herbert Holden Wood, St. Hilaire, Quebec, Canada, assignor to Canadian Industries Limited, Montreal, Quebec, Canada, a corporation of Canada
Filed Nov. 4, 1964, Ser. No. 408,940
Claims priority, application Great Britain, Nov. 12, 1963, 44,619/63
7 Claims. (Cl. 204—168)

ABSTRACT OF THE DISCLOSURE

The adhesive properties of one surface of a sheet of polyolefin film are improved by treating with a direct current diffuse electrical discharge passed along the surface of the moving film as the reverse side of the film moves over the insulated surface of a grounded electrically conducting support. The treatment renders the surface receptive to printing inks and thus improves its printability.

---

This invention relates to the treatment of the surfaces of polyolefin resins, the most common of which are polyethylene resins and more particularly to the treatment of the surfaces of polyethylene sheet material to make said surfaces receptive to printing inks.

Polyethylene resins have been used extensivly in packaging applications because of their advantages of light weight, toughness and inertness. However, it has been found difficult to print upon polyethylene surfaces with printing inks owing to the poor receptivity of polyethylene to said inks. When ink is applied to the surface of the polyethylene, it does not adhere and may be rubbed off easily.

It is an object of this invention to render polyethylene surfaces receptive to printing. An additional object is to render polyethylene surfaces receptive to printing inks by treatment with a high voltage electrical discharge. Additional objects will appear hereinafter.

In accordance with the invention, polyethylene surfaces are rendered receptive to printing inks by subjecting them to a high voltage, direct current diffuse corona discharge developed between two electrodes located on the same side of said surfaces. When the polyethylene surfaces are so treated, they readily accept printing inks which adhere firmly and cannot be rubbed off.

The treatment of this invention can conveniently be carried out with the apparatus shown in the accompanying drawings wherein FIGURE 1 is a diagrammatic perspective view of a sheet treating apparatus; and FIGURE 2 is a diagrammatic side elevation of a modification of the apparatus of FIGURE 1 in which a third electrode is employed.

In FIGURE 1, a polyethylene sheet 1 is shown passing over a electrically conductive roller 2 which is coated with a thin layer of polyethylene terephthalate 3 which acts as an electrical insulator. It is convenient to ground the roll 2 through a grounding conductor 4. The polyethylene sheet is guided by small rollers 5 and 6. At 7 is shown a first electrode which is located adjacent to and in parallel relationship to the sheet of polyethylene. The electrode 7 is of electrically conducting material and may be in the form of a wire mesh. The first electrode is connected to a source of high tension direct current through conductor 8. A second electrode 9 is positioned about a third of a revolution of the roll 2 distant from the first electrode. The second electrode lies adjacent to and in parallel relationship to the sheet of polyethylene. The second electrode is constituted by electrically conducting material similar to the first electrode. Electrode 9 is connected to ground through conductor 10. The electrodes are separated from the surface of the polyethylene sheet by a spacing which is adjustable.

It is important that the polyethylene sheet when passing beneath the electrodes be in contact with the insulated surface 3 of the roll 2.

In FIGURE 2 is illustrated a modification of the apparatus of FIGURE 1 in which an auxiliary, second grounded electrode 11 is employed, being grounded through a connection 12. The current flows from the intermediate electrode 7 to the two extremely spaced electrodes 9 and 11. In this embodiment of the invention guide rollers 5 and 6 are disposed to guide the sheet over at least a 240° segment of the roll circumference.

The procedure for treating the polyethylene sheet comprises passing said sheet successively under electrodes 7 and 9 of FIGURE 1 the first electrode 7 being at a high electrical potential with respect to ground and the second electrode 9 being at ground potential. While the exact mechanism of the surface treatment is not known with certainty, it is believed that the first electrode imparts a charge to the surface of the polyethylene sheet which then moves under the second electrode which conducts the charge to ground. In this manner a high voltage direct current charge passes along the surface of the sheet. It would appear that a diffuse corona discharge occurs in close proximity to the surface of the sheet. The motion of the film is necessary for the conduction of the electrical current since when the film is stationary, after a preliminary charging of the surface under the first electrode, there is no further flow of current. When the polyethylene sheet is moving, the charge imparted to the surface by electrode 7 is transported to the location under electrode 9 by which it is removed from the surface and passes to ground. It is possible to monitor the direct current passing through the conductor 10 to ground.

When the three electrode modification of the apparatus illustrated in FIGURE 2 is used, the sheet is passed successively under electrodes 11, 7 and 9, electrode 7 being at a high potential and electrodes 11 and 9 being grounded. In this case when the sheet is stationary as electrode 11 is adjacent to electrode 7 there may be leakage of current to ground.

It has also been found that operation of the apparatus is improved if a grounding electrode is placed adjacent to the insulated surface of the roll at a point of the roll circumference beyond the outgoing sheet position. It appears that this grounding electrode removes electric charges from the insulated surface of the roll thus permitting a higher charging current on the surface of the polyethylene sheet being treated.

It is to be understood that the spacing of the electrodes from the polyethylene sheet, the distance of the two electrodes from each other, the rate of speed of the polyethylene sheet and the potential difference between the electrodes can be adjusted to produce the most satisfactory surface treatment. The electric discharge should be of diffuse corona type and arcing should be avoided. A potential difference of 20,000 to 30,000 volts has been found satisfactory although lower voltages may be used if a radioactive source is employed, to ionize the atmosphere between the electrodes. The use of the radioactive source also tends to stabilize the diffuse discharge.

It has been found that the use of a second auxiliary, grounded electrode placed in advance of the high tension electrode, improves the operation of the surface treating apparatus. In this embodiment of the apparatus, it is necessary that the sheet of polyethylene be in contact with the insulated surface of the roll for about a 240° arc of rotation. The second grounded electrode is located approximately 30° of rotation in advance of the high tension electrode. The first grounded electrode is, in this case, located about 180° of rotation to the rear of the high tension electrode. It is believed that the advantage of this configuration of electrodes lies in spreading the diffuse electric discharge over a larger surface area of the polyethylene sheet.

The diffuse corona discharge passing along the surface of the polyethylene sheet modifies the surface so that printing inks will adhere thereto in contrast to the untreated surface.

The invention has been described in relation to the improvement of the surface of polyethylene for the reception of printing inks but it is not limited to this. The surface treatment of this invention also improves the bonding properties of polyethylene for materials such as paints, lacquers and adhesives.

The invention is additionally illustrated in the following example but it is to be understood that the scope of the invention is not limited to the embodimens shown therein.

*Example*

An experimental surface treating apparatus was assembled comprising a steel roll 3½ inches in diameter and 36 inches in length and two electrodes 2½ inches by ½ inch composed of wire braid. The roll was covered with a layer of 5 mils polyethylene terephthalate film. The first electrode was spaced ⅜ inch from the surface of the roll while the second electrode was almost touching the roll. The electrodes were separated by a distance of 3 inches from each other. The first electrode, positioned at the top of the roll, was connected to a source of high tension direct current power. The second electrode was grounded. A sheet of 7 mils polyethylene film was passed over the roll and beneath the electrode, the roll being turned by hand at a speed of about 60 r.p.m. The first electrode was at a voltage of 25,000 volts.

As the polyethylene film passed from under the high tension electrode to grounded electrode a hissing sound could be heard and approximately 100 µa. of current flowed between the electrodes.

The film which contained a treated area, which had passed under the electrodes, a non-treated area was covered with a film of red coloured printing ink, which was allowed to dry. When dry, the adherence of the printing ink was tested by applying thereto a strip of pressure sensitive tape and then stripping off the tape. The ink on the treated area of the polyethylene film adhered to the polyethylene but the ink on the untreated area was removed by the tape.

What I claim is:

1. A method for improving the adhesive properties of one surface of a polyolefin film which comprises,
    supporting the film with a ground electrically conductive support member having an electrically insulated surface, moving the supported film through a continuous direct-current diffuse electrical discharge formed between two spaced electrodes of different electrical potential positioned adjacent to said support member but on the reverse side of the film supported thereby, the motion of the film being in the direction of the electrode having the lower electrical potential, and
    adjusting the spacing between the electrodes, the potential difference therebetween and the speed of the film so as to maintain the discharge only when the film is in motion, the discharge ceasing when the film is stationary.

2. A method as claimed in claim 1 wherein the polyolefin is polyethylene.

3. A method as claimed in claim 2 wherein the potential producing the electrical discharge is between 20,000 and 30,000 volts.

4. A method as claimed in claim 2 wherein the support member is a rotatable roll.

5. A method for improving the adhesive properties of one surface of a polyolefin film which comprises,
    supporting the film with a grounded electrically conductive support member having an electrically insulated surface, moving the supported film along a path through a continuous direct-current diffuse electrical discharged formed between a first electrode of one polarity and two secondary electrodes of the opposite polarity where one of said secondary electrodes is positioned along said path in advance of said first electrode and the other secondary electrode is positioned along said path past said first electrode, the first electrode being positioned closer to the advance secondary electrode than to the other secondary electrode, wherein all of said electrodes are positioned adjacent to said support member but on the reverse side of the film supported thereby, and
    adjusting the spacing between the electrodes, the potention difference therebetween and the speed of the film so as to maintain the discharge only when the film is in motion, the discharge ceasing when the film is stationary.

6. A method as claimed in claim 5 wherein the support member is a rotatable roll and one secondary electrode is positioned 30° circumferentially in advance of the first electrode and the other secondary electrode is positioned 180° circumferentially past the first electrode.

7. A method as claimed in claim 5 wherein the polyolefin is polyethylene.

No references cited.

FOREIGN PATENTS 227,222  8/1958  Australia.

ROBERT K. MIHALEK, *Primary Examiner.*